United States Patent

Buzzelli et al.

[11] Patent Number: 5,563,004
[45] Date of Patent: Oct. 8, 1996

[54] RECHARGEABLE METAL-AIR ELECTROCHEMICAL CELL WITH HYDROGEN RECOMBINATION AND END-OF-CHARGE INDICATOR

[75] Inventors: Edward S. Buzzelli, Kennesaw; William C. Thibault, Powder Springs, both of Ga.

[73] Assignee: AER Energy Resources, Inc., Atlanta, Ga.

[21] Appl. No.: 407,697

[22] Filed: Mar. 21, 1995

[51] Int. Cl.[6] .................... H01M 10/48; H01M 12/02
[52] U.S. Cl. .................. 429/27; 429/59; 429/61; 429/92
[58] Field of Search .................. 429/27, 59, 61, 429/92, 93

[56] References Cited

U.S. PATENT DOCUMENTS

| | | | |
|---|---|---|---|
| 2,687,448 | 8/1954 | Gulick et al. | 136/179 |
| 3,080,440 | 3/1963 | Ruetschi et al. | 429/59 |
| 3,522,099 | 7/1970 | Schulte et al. | 136/86 |
| 3,600,228 | 8/1971 | Conti | 136/86 |
| 3,740,636 | 6/1973 | Hogrefe et al. | 320/2 |
| 3,832,238 | 8/1974 | Marui et al. | 136/179 |
| 3,895,284 | 7/1975 | Schweizer et al. | 320/48 |
| 4,002,496 | 1/1977 | Nitta et al. | 429/53 |
| 4,098,964 | 7/1978 | Reber | 429/86 |
| 4,143,212 | 3/1979 | Ueno et al. | 429/59 X |
| 4,194,146 | 3/1980 | Patry et al. | 320/44 |
| 4,207,514 | 6/1980 | Klein | 320/44 |
| 4,210,854 | 7/1980 | Godard | 320/10 |
| 4,247,812 | 1/1981 | Patry et al. | 320/44 |
| 4,288,734 | 9/1981 | Finger | 320/48 |
| 4,307,330 | 12/1981 | Belot | 320/44 |
| 4,679,000 | 7/1987 | Clark | 324/428 |
| 4,912,392 | 3/1990 | Faulkner | 320/44 |
| 4,925,746 | 5/1990 | Pavlov et al. | 429/57 |
| 4,925,747 | 5/1990 | Kordesch et al. | 429/59 |
| 5,156,925 | 10/1992 | Lapp | 429/19 |
| 5,162,169 | 11/1992 | Tomantschger et al. | 429/59 |
| 5,318,861 | 6/1994 | Harats et al. | 429/59 X |
| 5,328,777 | 7/1994 | Bentz et al. | 429/27 |
| 5,362,577 | 11/1994 | Pedecini | 429/27 |

FOREIGN PATENT DOCUMENTS

| | | | |
|---|---|---|---|
| 687393 | 9/1979 | U.S.S.R. | |
| 1443163 | 7/1976 | United Kingdom | 429/59 |

OTHER PUBLICATIONS

Gibbons et al., *Closed Cycle Aluminum/Oxygen Fuel Cell With Increased Mission Duration*, Power Sources Conference 1993, pp. 38–41.

*Primary Examiner*—Stephen Kalafut
*Attorney, Agent, or Firm*—Jones & Askew

[57] ABSTRACT

A rechargeable metal-air electrochemical cell comprising a hydrogen-oxygen recombination electrode recombines hydrogen produced at the anode with oxygen to replenish the supply of water in the cell. The cell comprises an oxygen gas-permeable, liquid water-impermeable air cathode disposed in the cell case such that the cell is substantially impermeable to liquid water and the cell can receive and discharge oxygen gas through an opening in the cell case. During the discharge mode of the cell, the recombination electrode is inactive, and during the recharge mode, the recombination electrode catalyzes the electrochemical recombination of hydrogen and oxygen in the cell to form water. According to another aspect, the cell can comprise a device for indicating the end of the charge mode by sensing the level of current between the cathode and the recombination electrode and comparing that current level to a predetermined current level. When the current level between the cathode and the recombination electrode exceeds the predetermined current level, the device indicates that the end of charge has been reached or can activate a recharge disconnect switch.

9 Claims, 3 Drawing Sheets

RECHARGEABLE METAL-AIR ELECTROCHEMICAL CELL WITH HYDROGEN RECOMBINATION AND END-OF-CHARGE INDICATOR

TECHNICAL FIELD

This invention relates to electrochemical cells, and more particularly relates to the recombination of hydrogen in rechargeable metal-air electrochemical cells.

BACKGROUND OF THE INVENTION

Electrochemical cells provide electrical power via a chemical reaction. A typical electrochemical cell includes a pair of electrodes called an anode and a cathode separated by an electrolyte composition. The anode, cathode, and electrolyte are contained in a casing and when the anode and cathode are electrically connected to a load, a chemical reaction between the anode, cathode, and electrolyte releases electrons and delivers electrical energy to the load.

Metal-air electrochemical cells utilize oxygen from ambient air as a reactant in an electrochemical reaction to provide a relatively lightweight power supply and include an air permeable cathode and a metallic anode separated by an aqueous electrolyte. Metal-air cells have a relatively high energy density because the cathode utilizes oxygen from ambient air as a reactant in the electrochemical reaction rather than a heavier material, such as a metal oxide or another depolarizable metallic composition. For example, during operation of a zinc-air cell, oxygen from the ambient air is converted at the cathode to hydroxide ions, zinc is oxidized at the anode, reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between an anode and the cathode of the cell and reversing the electrochemical reaction. During recharging, the cell discharges oxygen to the atmosphere through the air permeable cathode and the anode is electrolytically reformed by reducing to the base metal the metal oxides formed during discharge.

Hydrogen gas may be produced at the anode as a by-product during recharging of a metal-air cell. Hydrogen production normally occurs when the cell is nearly fully recharged and during overcharge of the cell. Hydrogen production increases significantly during overcharging. Typically, vents in the cell case release the hydrogen produced at the anode to the atmosphere. The hydrogen is released to prevent the hydrogen from reacting with other components of the cell and causing cell failure. In addition, it is desirable to prevent buildup of hydrogen in large quantities in the cell.

One drawback to the production of hydrogen and its release from the cell is that water is lost from the cell as a direct result. Water is also lost from a metal-air cell by evaporation through the gas-permeable cathode, but it is estimated that, when the atmosphere surrounding the cell is at about 50% relative humidity, 30-40% of the hydrogen loss from the cell is through electrolytic reaction and production of hydrogen gas. Loss of water through electrolytic reaction can eventually cause a rechargeable metal-air cell to fail due to drying out. This is particularly a problem when metal-air cells are excessively overcharged repeatedly.

Therefore, there is a need for a metal-air cell in which loss of hydrogen, and thus water, through electrolytic reaction is controlled.

SUMMARY OF THE INVENTION

This invention solves the above described problems in the art by providing a rechargeable metal-air electrochemical cell comprising a hydrogen-oxygen recombination electrode. The cell has two modes of operation, a discharge mode in which electricity is produced and a recharge mode in which electrical energy is stored and hydrogen gas may be produced. In addition to the hydrogen-oxygen recombination electrode, the cell comprises a case having an opening, an air cathode, an anode, and an aqueous electrolyte, all disposed in the cell case. The air cathode is permeable to oxygen gas and substantially impermeable to liquid water and is disposed in the cell case so that the cell is substantially impermeable to liquid water and the cell can receive and discharge oxygen gas through the opening in the cell case. The hydrogen-oxygen recombination electrode comprises a hydrogen-oxygen recombination system and is also disposed in the cell case. The aqueous electrolyte contacts the anode, the cathode, and the hydrogen-oxygen recombination electrode. The hydrogen-oxygen recombination electrode is connected to the cathode so that during the discharge mode, the hydrogen-oxygen recombination electrode is inactive, and during the recharge mode, the hydrogen-oxygen recombination electrode electrochemically recombines hydrogen and oxygen in the cell to form water. The recombination electrode operates as a hydrogen fuel cell electrode with the cathode to produce water. The water produced by the hydrogen, oxygen recombination replenishes to the cell water which would otherwise be lost by the venting of hydrogen from the cell. Because the metal-air cell is open to the atmosphere through the opening in the cell case and the air cathode, the amount of oxygen available for recombination with hydrogen produced in the cell is not limited. This allows for substantial overcharge of the cell without significant loss of water from the cell from the electrochemical reaction.

According to another aspect of the present invention, the rechargeable metal-air electrochemical cell further comprises a device for indicating when a predetermined level of recharge has occurred based on the level of current between the cathode and the hydrogen-oxygen recombination electrode. More particularly, the cell comprises a current level sensor for detecting the level of current between the cathode and the hydrogen-oxygen recombination electrode during the recharge mode and a comparator for comparing the level of current measured by the current sensor to a predetermined current level and indicating when the level of current measured by the current sensor exceeds the predetermined level. The predetermined level can be set at a level which indicates that the maximum amount of desirable recharge has be achieved. The amount of current between the cathode and the hydrogen-oxygen recombination electrode during the recharge mode is directly proportional to the degree to which the cell has been recharged. The predetermined level of current can be set so as to indicate when the maximum desirable amount of recharge has been achieved. When the comparator indicates that the level of current measured by the current sensor exceeds that predetermined level, a signal can then be sent to activate a desirable function, such as an alarm or an automatic shut-off of the recharge.

Accordingly, an object of the present invention is to provide an improved electrochemical cell.

Another object of the present invention is to provide an improved rechargeable metal-air cell.

Another object of the present invention is to provide a rechargeable metal-air cell with enhanced control over hydrogen gas production and water loss.

Still another object of the present invention is to provide a rechargeable metal-air cell that can withstand substantial overcharge during recharge without significant water loss from the cell.

Other objects, features and advantages of the present invention will become apparent from the following detailed description, drawings, and claims.

DETAILED DESCRIPTION OF DRAWINGS

As summarized above, the present invention encompasses a rechargeable metal-air electrochemical cell comprising a hydrogen-oxygen recombination electrode, and desirably, a device for indicating the level of recharge achieved by the cell. A detailed description of embodiments of the present invention are disclosed in detail below. Although the embodiments shown below are metal-air electrochemical cells, the present invention is also adaptable to other types of electrochemical cells.

Figure 1:
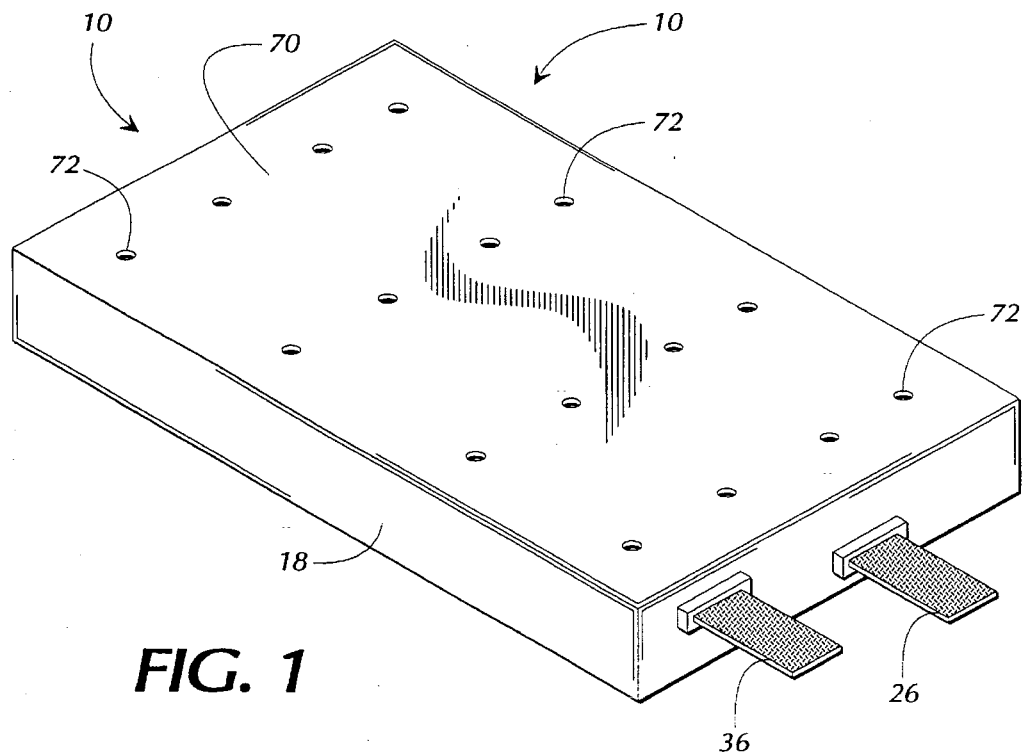
FIG. 1 is a perspective view of a rechargeable metal-air cell according to an embodiment of the present invention.
Figure 2:
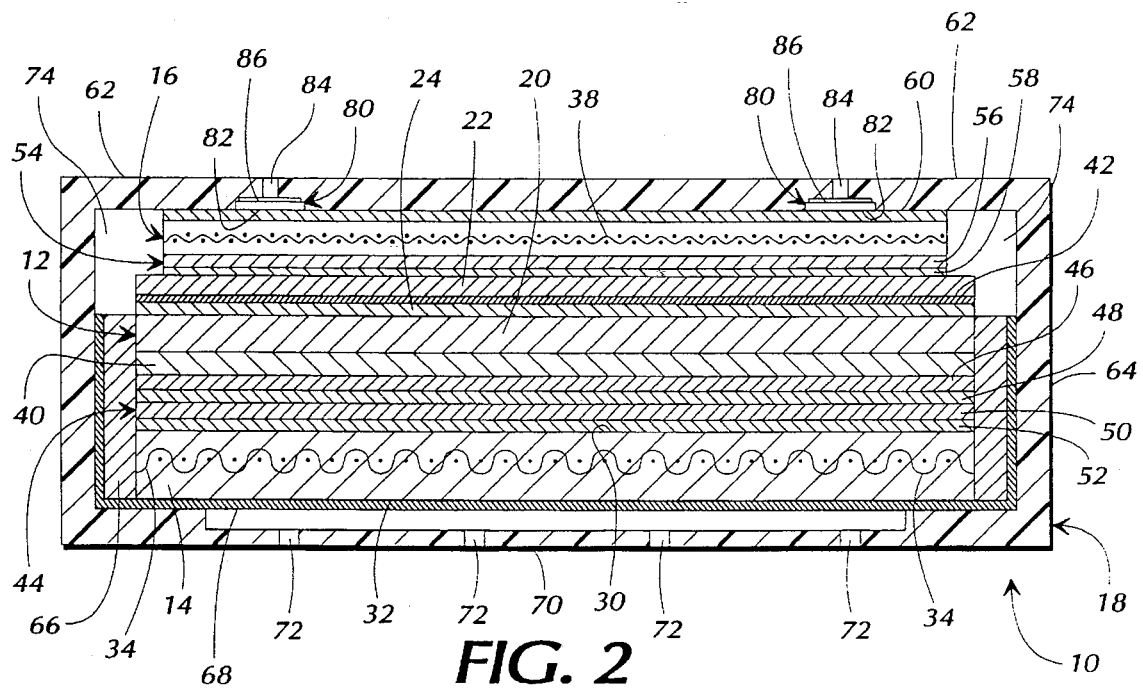
FIG. 2 is a partial, cross-sectional, elevation view of the metal-air cell shown in FIG. 1.

One embodiment of a metal-air cell 10 is shown in FIGS. 1 and 2 and generally comprises an anode 12, an air cathode 14, a hydrogen-oxygen recombination electrode 16, and an electrolyte disposed in a cell case 18. In FIG. 1, the cell 10 is oriented so that the cathode 14 is above the anode. In FIG. 2, the cell is inverted so that the anode 12 is above the cathode 14. During normal operation, the cell is desirably oriented so that the anode 12 is above the cathode as shown in FIG. 2.

The anode 12 can be any anode suitable for use in a metal-air electrochemical cell, but is shown in FIG. 2 as comprising an anodic layer 20, a rigid support 22, and a current collector layer 24 sandwiched between the anodic layer and the current collector layer. The current collector layer 24 is desirably a metal foil bonded to the anodic layer. The anode 12 further comprises a lead 26 for electrically connecting the anode to a load. The lead 26 extends beyond the periphery of the anode 12 and is attached to the current collector 24 with an ultrasonic weld.

The anodic layer 20 is desirably a sheet of solid, non-particulate metal that oxidizes under conditions of operation of an electrochemical cell to produce electrical energy. Suitable metals include zinc, aluminum, magnesium, lithium, iron, cadmium, and lead. The solid, non-particulate anodic layer 20 shown in FIG. 2, is an expanded, perforated metal sheet. The expanded, perforated metal sheet is made by passing a non-perforated metal sheet through a pair of rollers having meshing teeth which form a series of slits and corresponding projections in the metal sheet.

The current collector layer 24 extends adjacently and substantially entirely across one side of the anodic layer 20, covers substantially the entire anodic layer, and is pressure bonded to the anodic layer substantially entirely across the one side of the anodic layer. The current collector layer 24 is bonded to the anodic layer 20 with a metal-to-metal bond across the anodic layer so that the current collector layer is in good electrical contact with the anodic layer substantially entirely across the one side of the anodic layer and the electrical contact between the current collector layer and the anodic layer is substantially uniform. Desirably, the current collector layer 24 is bonded to the anodic layer 20 so that the current collector layer is substantially contiguous to the anodic layer substantially entirely across the one side of the anodic layer.

The current collector layer 24 comprises a metal which is capable of conducting electricity produced during discharge of the cell, but not being oxidized during discharge of the cell. Suitable metals for the current collector 24 are non-corrosive metals such as copper, nickel, tin, titanium, or silver. The current collector 24 should be thin and need only be thick enough to carry electric current to and from the anode. The current collector 24 is desirably about 1 mil thick. Thus, the current collector 24 can take the form of a sheet of metal foil sandwiched between the anodic layer 20 and the rigid support 22, as shown in FIG. 2, or can take the form of a layer of metal plated onto either the anodic layer or the rigid support. Suitable methods of plating include electroplating, lamination bonding, sputtering, powder coating or hot stamping a foil. Another suitable method of bonding the current collector 24 is to position a metal foil current collector material in intimate contact with the anodic layer in an electrochemical cell, and then discharging and charging the cell to plate the anodic layer onto the current collector.

Desirably, the current collector 24 is a substantially solid sheet of metal that covers substantially the entire one side of the anodic layer 20 so that there is substantially uniform current density across the anode. For small anodes, holes in the current collector may not be necessary to vent gas produced at the anode, but with larger current collectors, it may be necessary to have at least a sufficient number of pin holes to vent gas through the current collector during discharge of the cell.

The anode lead 26 is made of the same type metal that forms the current collector 24. The lead 26 can be an integral part of the current collector layer 24 or can be a separate lead attached to the current collector. This is particularly advantageous when the current collector layer 24 is a solid, substantially unperforated metal sheet such as metal foil because the lead 26 can be made from foraminous material which is less likely to form a leak path for electrolyte between the lead and the cell case. The lead 26 shown in FIG. 1 is made of expanded metal.

Suitable methods for bonding the current collector layer 24 to the anodic layer 20 include pressure bonding which is a method for joining parts together with pressure and with or without heat. No filler metal is employed in pressure bonding. The parts to be joined are first locally heated at the place where the joint is to be formed and are then squeezed together so that they are united with a metal-to-metal bond. Pressure bonding can be performed by passing two layers of metal through the nip between two rollers or pressing the two layers of metal between a platen and a stationary anvil. Another method of pressure bonding is ultrasonic bonding.

The current collector layer 24 and the anodic layer 20 should be pressure bonded at a temperature and pressure sufficient to create a metal-to-metal bond between the current collector layer and the anodic layer without distorting the current collector layer or the anodic layer. To avoid melting and distortion, the temperature of the heated roller or platen should be less than the melting point of the lowest melting metal of the current collector layer or the anodic layer. For example, a current collector layer comprising a 1 mil thick sheet of silver foil can be pressure bonded to an anodic layer comprising a sheet of expanded, perforated non-particulate metal zinc by pressing the entire current collector layer and anodic layer between a platen having a temperature within the range from about 650° F. (343° C.) to about 750° F. (398° C.) and an anvil at a pressure within the range from about 1,500 to about 5,000 psi. The silver current collector layer is positioned adjacent the heated anvil. This achieves electrical contact between the current collector layer and the anodic layer across substantially the entire one side of the anodic layer. For more efficient manufacturing, the current collector layer and the anodic layer metals are in the form of a clad metal sheet which is made by passing the two layers of metals through the nip between two rollers at elevated temperature and pressure.

The rigid support 22 comprises a material, such as polypropylene, that is not capable of being oxidized during discharge of the cell so that the rigid support maintains support of the current collector during operation of the cell. The purpose of the rigid support 22 is to maintain the current collector layer 24 in a configuration which is substantially the same as the original configuration of the current collector layer during discharging and recharging of the cell. In FIG. 2 the original configuration of the current collector layer 24 is a planar sheet. Thus, the rigid support 22 is a planar sheet and is of sufficient rigidity to maintain the current collector layer 24 in that configuration during operation of the cell. The rigid support 22 extends across substantially the entire current collector layer 24 opposite the anodic layer 20 so that the current collector layer is sandwiched between the anodic layer and the rigid support.

The rigid support 22 shown in FIG. 2 is a substantially solid flat sheet. However, it should be understood that the rigid support 22 should not block the venting of gas produced during recharging of electrochemical cells. Desirably, the rigid support 22 forms a flow path for releasing gas produced at the anode. Porous or perforated materials can be used to form a rigid support that allows the release of gas. POREX porous polypropylene available from Porex Technologies, of Fairburn, Ga. is useful to make the rigid support and allows the flow of gas therethrough. The mounting of the rigid support within the cell case 18 is discussed in more detail below, as well as alternative embodiments of the rigid support.

A suitable electrolyte is an aqueous electrolyte including a Group I metal hydroxide such as LiOH, NaOH, KOH, CsOH, or the like.

A suitable air cathode 14 is a porous, sheet-type cathode including an active layer directly adhered to a gas-permeable, liquid-impermeable, wet-proofing layer as disclosed in U.S. Pat. Nos. 3,977,901 and 5,306,579, the disclosures of which are expressly incorporated herein by reference. The active layer of the cathode 14 forms the electrolyte side 30 of the cathode and faces the electrolyte. The active layer includes catalyzed particles of activated carbon and particles of a hydrophobic polymer such as polytetrafluoroethylene. The wet-proofing layer forms the air side 32 of the cathode 14 and includes a mixture of carbon black particles and polytetrafluoroethylene particles. The cathode 14 further includes a metal current collector 34 which has a lead 36 extending therefrom for connection to a positive terminal for the cell 10. Suitable current collectors include fine mesh metal screens and expanded, perforated metal sheets made of non-corrosive metal such as nickel, tin, or titanium.

A suitable cathode can be made in accordance with U.S. Pat. No. 3,977,901 with the following recipe:

| Component | Loading (mg/cm$^2$ of Cathode) |
|---|---|
| ACTIVE LAYER | |
| carbon black (Shawinigan) | 68.5 |
| Teflon T30B | 14.2 |
| Ag | 2.6 |
| NiS | 3.4 |
| Fe WO$_4$ | 3.4 |
| WC/12 wt % Co | 3.4 |
| HYDROPHOBIC LAYER | |
| carbon black | 19.5 |
| Teflon T30B | 3.5 |

The metal-air cell 10 further comprises a hydrogen-oxygen recombination electrode 16 disposed in the cell case 18. The recombination electrode 16 should be located in the cell 10 so that hydrogen gas produced at the anode 12 contacts the recombination electrode. In FIG. 2, the anode 12 is positioned between the recombination electrode 16 and the air cathode 14 so that the cell 10 can be operated with the cathode facing downwardly and the recombination electrode above the anode. In this orientation, the hydrogen produced at the anode 12 rises towards and contacts the recombination electrode 16. Alternatively, a recombination electrode can be positioned between the anode 12 and the air cathode 14 as shown in FIG. 5. The connection of the recombination electrode 16 to the air cathode 14 and the operation of the cell 10 will be described further below.

The recombination electrode 16 can be any hydrogen-oxygen recombination electrode provided the composition of the recombination electrode is compatible with the electrolyte and the other components of the cell. Hydrogen-oxygen recombination electrodes are well known and contain an active layer adhered to a current collector 38. The active layer comprises a mixture of a hydrogen-oxygen recombination catalyst, activated carbon, and a hydrophobic binder, such as, polytetrafluoroethylene. The recombination electrode 16 can be made in the same manner as the cathode 14. Suitable catalysts include noble metals, such as platinum, and other known hydrogen-oxygen recombination catalysts. The current collector can be the same as that used for the cathode 14. A desirable recipe for the recombination electrode 16 is 25% by weight high surface area platinum powder, 20% by weight carbon black (SHAWINIGAN), and 78% by weight Teflon T 30B. Nickel and silver screens are desirable current collectors.

The metal-air cell 22 further comprises a system for separating the electrodes of the cell so that the electrodes do not come into direct electrical contact with one another and short-circuit the cell. The separator system also absorbs and wicks electrolyte to keep electrolyte in contact with the electrodes. The separator system includes a first porous web 40 contiguous to the electrolyte side of the anode 12. The first porous web 40 comprises entangled fibers made from a material which is oxidation-resistant under conditions of operation of a metal-air cell and absorbs electrolyte in the cell. The first porous web 40 is desirably made of polymeric fibers or filaments with substantial void space between the fibers or filaments. Suitable polymers for making the first porous web 40 include nylon, polypropylene, and polyvinyl alcohol. The first porous web 40 extends substantially completely across the anodic layer 20 of the anode 12 and is wettable and wicks and distributes the electrolyte across the electrolyte side of the anode. If not naturally wettable with electrolyte, the polymeric fibers or filaments can be surface treated with surfactants or other means to become wettable.

During the first discharge/recharge cycle of a metal-air cell containing the anode 12, the anodic layer 20 is oxidized on discharge to metal oxides or metal ions and on recharge is reformed as a body or cake of particulate metal. The porous web 40 is permeable to the electrolyte and to the ions and compounds of the metal from the anodic layer 20 in the electrolyte of the cell so that during recharging of the cell, the metal can be reformed interstitially through the web into a porous metal structure. The porous web 40 therefore increases the porosity of the anode 12 so that the anode does not become over-densified and passivate, and the interior of the anodic layer 20 is accessible to electrolyte. A suitable material for the first porous web 40 is a nylon fiber web available as Nylon #TR1113G available from Hollingsworth & Vose of East Walpole, Mass. The cell 10 may comprise a second porous web 42 sandwiched between the current collector layer 24 and the rigid support 22 for wicking electrolyte and cooling the anode 12. A suitable material for the second porous web 42 is a web of polyvinyl alcohol and rayon fibers available from the Dexter Corporation of Windsor-Locks, Conn. under the designation 7487.

The separator system of the metal-air cell 10 further comprises a first separator package 44 disposed between the anode 10 and the cathode 24. The separator package includes first and second polymer separator layers 46 and 48 proximate the anode 12 and first and second porous webs 50 and 52 proximate the cathode 14. The first polymer separator 46 is oxidation-resistant under conditions of operation of the metal-air cell and is permeable to electrolyte, but substantially impermeable to ions and compounds of the metal from the anodic layer 12, Thus, the first separator 46 allows the flow of electrolyte but retains the metallic ions and compounds from the anodic layer 20 at the anode 12 and separate from the other components of the metal-air cell. The first separator 46 extends substantially completely across the entire surface of the first porous web 40 adjacent the anode 12 and also inhibits the growth of metal dendrites on the anode. The second separator 48 is identical to the first separator 46 in structure and function and is positioned contiguously to the first separator. A suitable material for the separators 46 and 48 is 3501 CELGARD wettable microporous polypropylene from Hoechst Celanese Corporation of Charlotte, N.C.

The first and second porous webs 50 and 52 proximate the cathode 14 are porous webs of entangled strands, for absorbing electrolyte and wicking the electrolyte across the entire cathode. The porous webs 50 and 52 also space the cathode 14 from the separators 46 and 48 and the anode 12. The first and second porous webs 50 and 52 extend contiguously to one another between the second polymer separator 48 and the air cathode 14. A suitable material for the first and second porous webs 50 and 52 is Nylon #TR1113G available from Hollingsworth & Vose of East Walpole, Mass.

The separator system of the cell 10 also includes a second separator package 54 positioned between the recombination electrode 16 and the rigid support 22 of the anode 12. This second separator package 54 includes first and second polymer separators 56 and 58 identical to the first and second polymer separator 46 and 48 between the anode 12 and the cathode 14. In addition, another porous web 60 is disposed between the recombination electrode 16 and the cell case 18. This porous web is identical to the second porous web 42 between the rigid support 22 and the current collector layer 24 of the anode 12.

The anode 12, air cathode 14, recombination electrode 16, electrolyte, and separator system are all disposed in the cell case 18 comprising a substantially planar, rectangular first member 62 and a substantially rectangular second member 64 having the shape of an inverted tray. The first member 62 is heat welded to the second member 64 to form the rectangular, box-shaped case 18.

A portion of the anode 12, the first and second porous webs 40 and 42 proximate the anode, and the first separator package 44 extend between a rectangular support 66 which fits about the interior of the cell case 18. A gas-permeable, liquid-impermeable membrane 68 fits tightly between the cell case 18 and the rectangular support 66. The membrane 68 extends across the air side 32 of the cathode 14 and allows passage of air to and from the cathode, but seals electrolyte within the cell case 18. A suitable material for the membrane 68 is CELGARD 2400 microporous polypropylene membrane available from Hoechst Celanese Corporation of Charlotte, N.C.

As best shown in FIG. 1, the cell case 18 also includes a mask member 70 which extends over and is spaced from the air cathode 14. The mask 70 forms an air plenum over the air cathode 14 and has a plurality of openings 72 substantially evenly distributed across the mask member for allowing air to enter the cathode plenum. The mask member 70 controls the exposure of the air cathode 14 to air. The mask member 70 allows a sufficient amount of air to the cathode 14 for adequate power production from the cell, but limits the exposure of the air cathode to air to minimize exposure of the air cathode to moisture and contaminants to prevent premature failure of the cell from flooding, drying out, or contamination. Although not shown in FIG. 1, the cathode plenum formed by the mask member 70 can include a grid structure for maintaining separation between the mask member and the air cathode 14. Alternatively, the cathode plenum can be filled with a porous material, such as a non-woven fibrous material. A suitable mask member is disclosed in U.S. Pat. No. 5,328,777 entitled "Cathode Cover for Metal-Air Cell," the disclosure of which is expressly incorporated herein by reference in its entirety.

Figure 3:
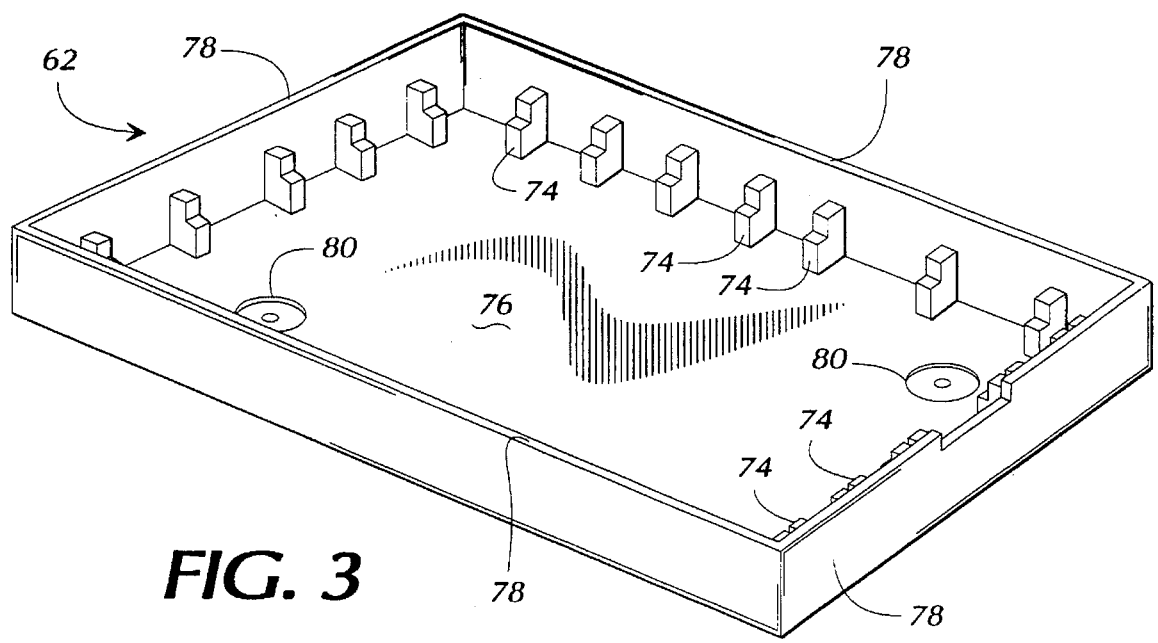
FIG. 3 is a perspective view of the anode case of the metal-air cell shown in FIG. 1.

The first member 62 of the cell case, best shown in FIG. 3, includes a plurality of spacers 74 integral with and extending from the interior of the case about the periphery of the case. The spacers 74 are spaced from one another and space the anode 12 of the cell 10 from the first member 62 as shown in FIG. 2. The rigid support 22 of the anode 12 is mounted on the L-shaped spacers 74 of the first member 62 and is spaced from the main panel 76 of the first member and the side walls 78 of the first member by the L-shaped spacers. The recombination electrode 16, the second separator package 54, and a portion of the anode 12 extend between the L-shaped spacers.

The gap between the first member 62 and the rigid support 22 formed by the L-shaped spacers 74 provides a flow path for the release of hydrogen gas produced at the anode 12. Gas can flow from the anodic layer 20 and current collector 24 of the anode 12 between the side walls 78 of the first member 62 and between the main panel 76 of the first member and the rigid support 22 to the recombination electrode 16, at which the hydrogen gas is electrochemically recombined with oxygen to produce water.

Alternatively to the flat plate rigid support 22 shown in FIG. 2, the rigid support can comprise a rectangular sheet with a plurality of pinholes substantially evenly distributed across the rigid support for releasing gas from the anode, or a rectangular sheet of rigid material having a network of channels running across the side of the rigid support that faces the current collector to provide a flow path for the release of gas from the anode. In addition, the rigid support can comprise a mechanical spring to exert force against the anode 12 and keep the current collector 24 contiguous with the anodic layer 20. For example, the rigid support can comprise a bowed sheet of rigid material that functions as a mechanical spring. When the bowed support is substituted for the flat rigid support 22 shown in FIG. 2; the convex side of the bowed support faces the current collector 24 and the bowed support is compressed so as to be substantially flat as the rigid support 22 is shown in FIG. 2. The rigid support 22 could also include a rectangular rigid plate with a plurality of contoured tabs extending out the plane of the flat sheet of the rigid support from the periphery of the flat sheet. The tabs function as leaf springs when the rigid support is incorporated into a cell.

The cell case 18 also includes a number of gas release vents 80 in the first member 62 of the cell case. The vents 80 include recesses 82 in the first member 62 with a central opening 84 therein covered with a gas-permeable, liquid-impermeable plug 86. This plug 86 releases any hydrogen gas which is not recombined, but does not allow leakage of electrolyte. The plug 86 comprises a plug of ultrafine polyethylene 4925 available from Porex Corporation in Fairburn, Ga., sandwiched between a porous polypropylene film and a teflon film. The teflon film faces the recombination electrode. The polypropylene film is a CELGARD microporous membrane available from Hoechst Celanese Corporation, in Charlotte, N.C. Preferred CELGARD microporous membranes are CELGARD 2400 and 2500 membranes. These membranes are heat welded or embossed onto the first member 62 of the cell case 18.

Figure 4:
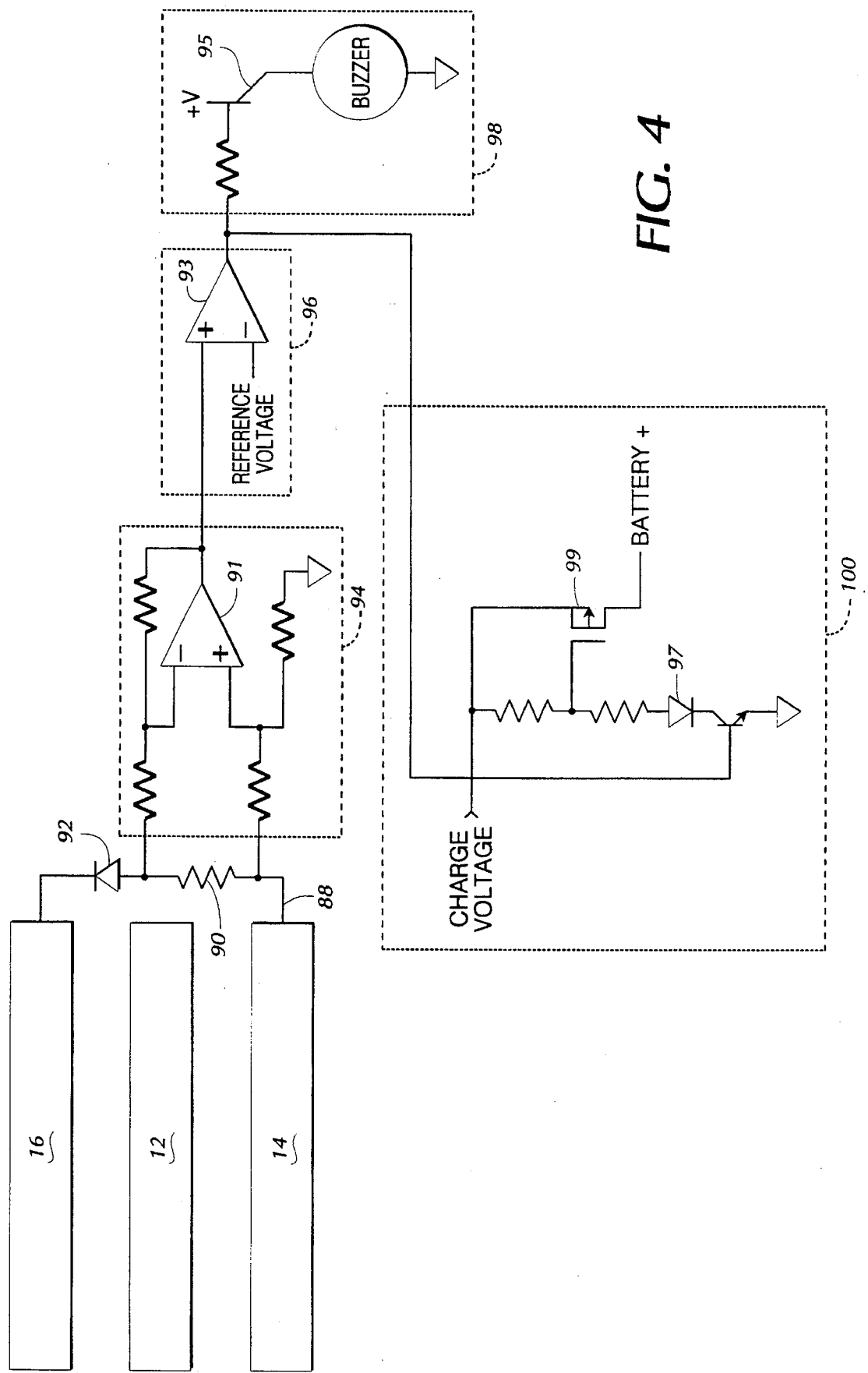
FIG. 4 is a partial schematic diagram of the metal-air cell shown in FIG. 1 illustrating the end-of-charge indicator circuit.

Turning to the schematic diagram in FIG. 4, the electrical connection between the cathode 14 of the cell 10 and the recombination electrode 16 is illustrated. The recombination electrode 16 is electrically connected to the cathode 14 via a conductive line 88, such as a wire, extending between respective current collector tabs of those electrodes. Between the cathode 14 and the recombination electrode 16, the conductive line 88 is connected to a high resistance resistor 90 and a diode 92 in series. The resistor 90 should be gauged to control the amount of current flowing to the recombination electrode such that the current is sufficient to convert the amount of hydrogen produced by the anode 12 but not substantially in excess of that level of current. The diode 92 allows current to flow from the cathode 14 to the recombination electrode 16 during the recharge mode of the cell 10, but does not allow current flow from the recombination electrode 16 to the cathode during the discharge mode of the cell. Thus, during the discharge mode of the cell 10, the recombination electrode is inactive, and during the recharge mode, the recombination electrode electrochemically recombines hydrogen and oxygen in the cell to form water.

Because the level of current between the cathode 14 and the recombination electrode 16 during recharge is directly proportional to the level of recharge achieved, the level of current through the resistor 90 between the cathode and recombination electrode is an indication of the level of recharge and can be used to indicate the appropriate end of the recharge cycle. A device for indicating the end of recharge by sensing the level of current across the resistor 90 is shown schematically in FIG. 4. A current level sensor 94 is connected to the resistor 90 and senses the level of current through the resistor 90 and is connected to a comparator 96. The comparator 96 receives an indication of the current level from the sensor 94 and compares that indicated current level to a predetermined cutoff level. The predetermined cutoff level is set at a level that indicates an appropriate end of the recharge cycle. If the level of current measured by the current level sensor 94 exceeds the predetermined cutoff level, then the comparator emits a signal to that effect which can activate a device, such as an alarm 98 or a recharge disconnect switch 100.

Viewing the circuitry of FIG. 4 in more detail, the current level sensor 94 includes an op-amp 91 configured as a difference amplifier to measure the difference in voltage across the resistor 90. The monitored voltage difference or output of op-amp 91 indicates the level of current flow to the recombination electrode 16. The output of op-amp 91 is then fed to a comparator 96 where the output voltage of the op-amp 91 is compared to a predetermined reference voltage of the op-amp 93. The reference voltage is selected as the cutoff level for the recharge circuit. When the monitored current level causes the input voltage of the op-amp 93 to equal the reference voltage, the op-amp 93 produces an output signal. The output signal turns on the transistor 95 causing the buzzer to sound and also turns on the transistor 97 causing the transistor 99 to turn off. When transistor 99 turns off, the charge path to the battery is interrupted which inhibits charging of the battery.

It should be understood that the foregoing relates to particular embodiments of the present invention, and that numerous changes may be made therein without departing from the spirit and scope of the invention as defined by the following claims.

We claim:

1. A rechargeable metal-air electrochemical cell which has two modes of operation, a discharge mode in which electricity is produced and a recharge mode in which electrical energy is stored and hydrogen gas may be produced, the cell comprising:

a. a case having an opening;

b. an air cathode being permeable to oxygen gas and substantially impermeable to liquid water and disposed in the cell case so that the cell is substantially impermeable to liquid water and the cell can receive and discharge oxygen gas through the opening;

c. an anode disposed in the cell case;

d. a hydrogen-oxygen recombination electrode comprising a hydrogen-oxygen recombination catalyst and being disposed in the cell case; and e. an aqueous electrolyte disposed in the cell case and contacting the anode, the cathode, and the hydrogen-oxygen recombination electrode, wherein the hydrogen-oxygen recombination electrode is connected to the cathode, so that during the discharge mode, the hydrogen-oxygen recombination electrode is inactive, and during the recharge mode, the hydrogen-oxygen recombination electrode catalyzes the recombination of hydrogen and oxygen in the cell to form water.

2. A rechargeable metal-air electrochemical cell which has two modes of operation, a discharge mode in which electricity is produced and a recharge mode in which electrical energy is stored and hydrogen gas may be produced and wherein a level of current flows between the cathode and the hydrogen-oxygen recombination electrode during the recharge mode, the cell comprising:

a. a case having opening;

b. an air cathode being permeable to oxygen gas and substantially impermeable to liquid water and disposed in the cell case so that the cell is substantially impermeable to liquid water and the cell can receive and discharge oxygen gas through the opening;

c. an anode disposed in the cell case;

d. a hydrogen-oxygen recombination electrode comprising a hydrogen-oxygen recombination catalyst and being disposed in the cell case;

e. an aqueous electrolyte disposed in the cell case and contacting the anode, the cathode, and the hydrogen-oxygen recombination electrode, wherein the hydrogen-oxygen recombination electrode is connected to cathode, so that during the discharge mode, the hydrogen-oxygen recombination electrode is inactive, and during the recharge mode, the hydrogen-oxygen recombination electrode catalyzes the recombination of hydrogen and oxygen in the cell to form water;

f. a current level sensor for detecting the level of current between the cathode and the hydrogen-oxygen recombination electrode during the recharge mode; and g. a comparator for comparing the level of current measured by the current sensor to a desired current level, which is proportional to a desired amount of cell recharge, and indicating when the level of current measured by the current sensor exceeds the desired level.

3. A rechargeable metal-air electrochemical cell as in claim 2 further comprising an alarm for indicating when the level of current measured by the current sensor exceeds the desired level.

4. A rechargeable metal-air electrochemical cell as in claim 1 wherein the cathode and the hydrogen-oxygen recombination electrode are connected through a resistor and diode in series, the diode being operable to allow current flow between the cathode and the hydrogen-oxygen recombination electrode when the cell is in the recharge mode and being operable to block current flow between the cathode and the hydrogen-oxygen recombination electrode when the cell is in the discharge mode.

5. A rechargeable metal-air electrochemical cell as in claim 1 wherein the anode is positioned between the cathode and the hydrogen-oxygen recombination electrode.

6. A rechargeable metal-air electrochemical cell as in claim 1 wherein the hydrogen-oxygen recombination catalyst comprises a noble metal.

7. A rechargeable metal-air electrochemical cell as in claim 1 wherein the hydrogen-oxygen recombination catalyst comprises platinum.

8. A rechargeable electrochemical cell which has two modes of operation, a discharge mode in which electricity is produced and a recharge mode in which electrical energy is stored and hydrogen may be produced, the cell comprising:

a. a case having an opening;

b. a cathode disposed in the cell case;

c. an anode disposed in the cell case;

d. a hydrogen-oxygen recombination electrode comprising a hydrogen-oxygen recombination catalyst and being disposed in the cell case, the hydrogen-oxygen recombination electrode being connected to the cathode, so that during the discharge mode, the hydrogen-oxygen recombination electrode is inactive, and during the recharge mode, a level of current flows between the cathode and the hydrogen-oxygen recombination electrode and the hydrogen-oxygen recombination electrode catalyzes the recombination of hydrogen and oxygen in the cell to form water;

e. an electrolyte disposed in the cell case and contacting the anode, the cathode, and the hydrogen-oxygen recombination electrode;

f. a current level sensor for detecting the level of current between the cathode and the hydrogen-oxygen recombination electrode during the recharge mode; and g. a comparator for comparing the level of current measured by the current sensor to a desired current level, which is proportional to a desired amount of cell recharge, and indicating when the level of current measured by the current sensor exceeds the desired level.

9. A rechargeable electrochemical cell as in claim 8 further comprising an alarm for indicating when the level of current measured by the current sensor exceeds the desired level.

\* \* \* \* \*